Figure 4:
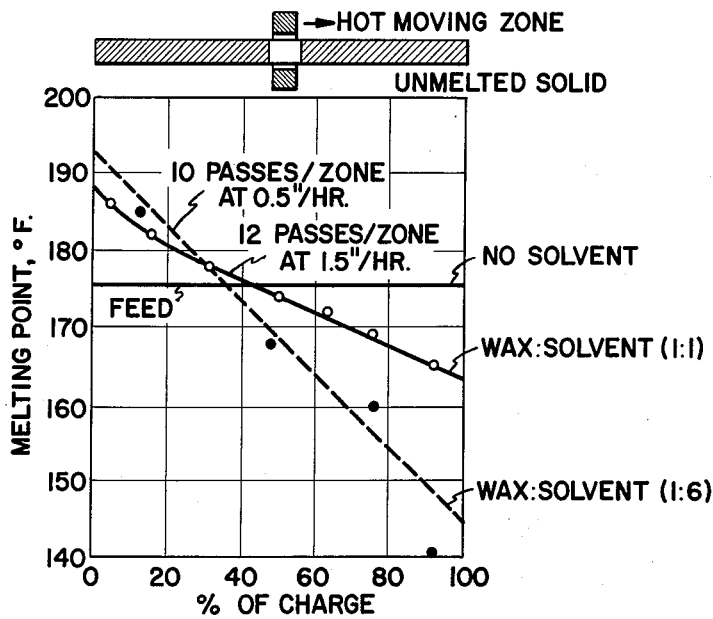

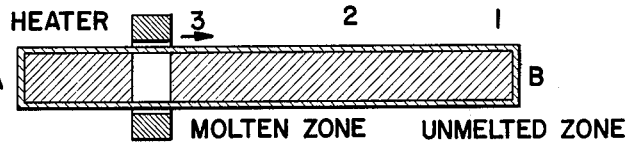
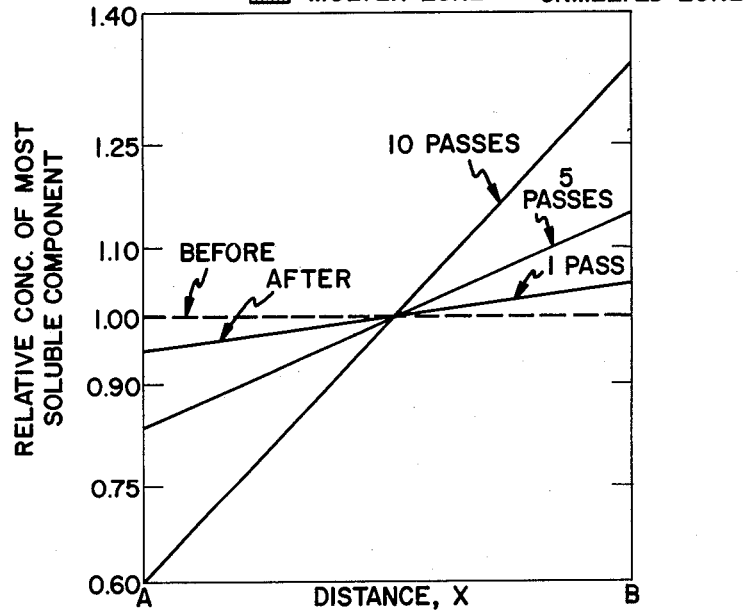
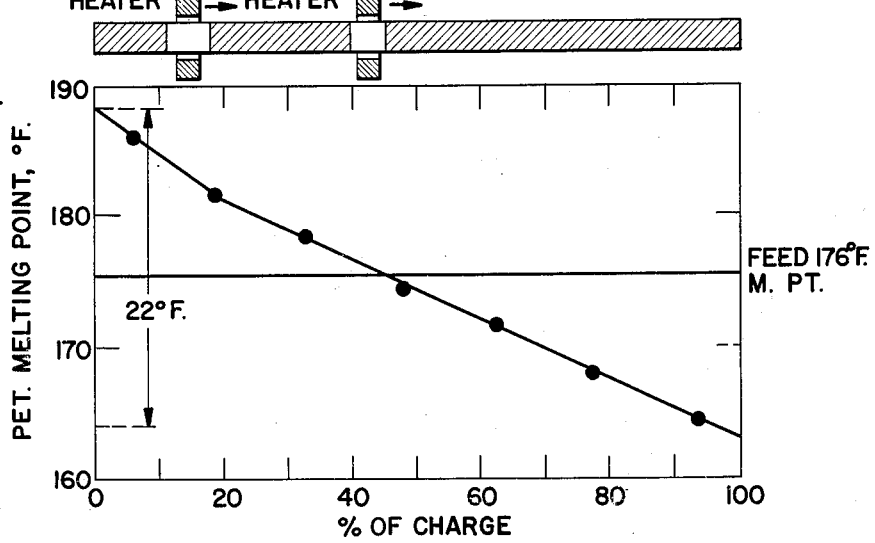

May 7, 1963     I. A. ELDIB ETAL     3,088,907
FRACTIONATION MIXTURES BY ZONE PRECIPITATION
Filed June 15, 1960     2 Sheets-Sheet 2

Ibrahim A. Eldib
George E. Charles     Inventors
Donald L. Baeder

By *Paul A. Denham* Patent Attorney

United States Patent Office 3,088,907
Patented May 7, 1963

3,088,907
FRACTIONATION MIXTURES BY ZONE
PRECIPITATION
Ibrahim A. Eldib, Union, George E. Charles, Westfield, and Donald L. Baeder, Berkeley Heights, N.J., assignors to Esso Research and Engineering Company, a corporation of Delaware
Filed June 15, 1960, Ser. No. 36,262
11 Claims. (Cl. 208—24)

This invention relates to a new and useful technique for the separation of two or more materials from a mixture thereof. More specifically, this invention teaches fractionation by dissolving a mixture in a solvent and thereafter concentrating one or more components in one portion of the solvent, thereby depleting one or more components from the remaining portion of the solvent. This technique shall be referred to herein as zone precipitation.

It has long been a problem in industry, specifically the chemical and petroleum industries, to separate mixtures into various component parts. Such separations are desirable to improve product quality by removing impurities or to simply divide out components which have greater value when not associated with other components.

Many separation procedures are well known. For example, where relatively low boiling materials of different boiling points are in admixture, fractional distillation may be a suitable unit operation.

In more recent years, a procedure known as zone melting has been developed and found particular applicability in the metallurgical industries. The value of this mode of separation is based on the different melting points of the components. By passing a hot zone from one end to the other of an elongated mass of an impure alloy, the impurities may be concentrated at one end of the mass. See Zone Melting, W. G. Pfann, John Wiley & Sons, New York (1958). While this technique is of value for the separation of materials having good crystallinity, it cannot be applied to the refinement of less crystalline components. This drawback has been noted in the literature, Ball et al., The Refining Engineer, December 1958, p. C36.

The ineffectiveness of zone melting for purifying systems with ill-defined crystal form is probably due to entrapment of mother liquor between crystals during crystallization. The effect of this phenomenon would be to prevent diffusion of impurities out of the solid being purified.

Still another separation procedure which has come into use in recent years is fractional crystallization. This technique is described in a U.S. patent to Schmidt, 2,617,274, and Reissue 23,810 (1954). It is further described in U.S. Patent Nos. 2,815,364, 2,822,249, 2,839,411, 2,890,938, and 2,890,962. Basically, in this separation process, the crystals obtained from one batch crystallization are redissolved in a solvent or remelted and further crystallized. This process is repeated until the desired purification is obtained. Since fractional crystallization involves the countercurrent movement of two phases, i.e. the movement of the mother liquid and crystals in opposite directions, it is necessary to physically transport the phases from one unit to the other. This is an extremely tedious technique which requires large amounts of equipment and working space, and thereby limits the applicability of this process in commercial installtions.

In accordance with the instant invention, it has been found that foregoing disadvantages inherent in hitherto known separation techniques may be overcome by zone precipitation.

In zone precipitation, the binary or more complex mixture to be separated is dissolved throughout a suitable solvent and cooled to form a solid column or elongated mass. A hot zone is moved relative to the column, and the portion of the solid in the immediate vicinity of the hot zone is liquefied. As the hot zone progresses down the column, the least soluble components in the solvent crystallize behind the moving zone. Hence, the most soluble components remain in the liquid and move in the direction of the moving zone. After the zone has passed over the entire column, the components of greatest solubility will be depleted behind the zone and concentrated in the direction of separation. By repeated passes, a greater degree of separation may be obtained.

This brief discussion of zone precipitation futrher shows the advantages of the instant invention over fractional crystallization. The effect of countercurrent movement of the solid and liquid phases is achieved merely by the movement of the molten zones and can simply be carried out on a large scale. In addition, zone precipitation can be applied continuously with as many stages as desired using only the initial solvent, whereas in fractional crystallization additional solvent must be added in each stage.

To further illustrate the instant invention, reference is made to FIGURES 1 and 2.

FIGURE 1 illustrates the most basic apparatus for the practice of the instant invention. The mixture to be separated is dissolved in a solvent and is represented in container 1 by the numeral 2. A heater 3, which surrounds the column 1, is shown in cross-section. The heater moves slowly from end A to B of the column 1 as illustrated by the arrow. As the heater progresses, the area in its immediate vicinity is melted. As it continues towards end B, the previously molten zone solidifies, rejecting the most soluble components as previously described. The heater 3 passes from end A to B as many times as desired.

FIGURE 2 graphically represents the relative concentration of the most soluble components in hypothetical mixture across the column from ends A to B to separation and after 1, 5, and 10 heater passes. After the desired number of passes are made, the solid column containing the mixture and the inert solid is removed from the container and divided into portions as desired. The solvent remains dissolved throughout the column and may then be removed from each portion by any suitable means such as, for example, evaporation.

Zone precipitation can be operated as a continuous process. Equipment described in the literature, Pfann, supra, pp. 115 to 152, for continuous zone melting can be adapted to zone precipitation.

The types of mixtures which may be separated in accordance with this are manifold. For example, microcrystalline wax may be segregated into components of varied melting points or zone precipitation may be used to refine synthetic polymers having a wide molecular weight distribution into fractions having comparatively narrow molecular weight ranges.

Other materials which may be fractionated in accordance with this invention may be mixtures of hydrocarbons such as p- and m-xylene, polynuclear aromatics such as naphthalene, anthracene, phenanthrene, etc. Also mixtures of substituted hydrocarbons such as o- and p-cresol, o- and p-nitrophenol, o- and p-nitrobenzoic acids, ketones, alcohols, and aldehydes; natural materials such as asphaltenes, vitamins, sucroses, dextroses, and starches, can also be separated. Mixtures of inorganic salts can also be separated.

The above separations are merely examples of areas of application of the instant invention. This technique may be applied to the separation of all solids or solidified liquids whether they be crystalline, partially amorphous, or completely amorphous. It is necessary only that the components to be separated are soluble to dissimilar degrees in a suitable solvent.

The solvent used in accordance with the invention varies depending on the components to be separated.

For example, liquid organic solvents such as hexane, heptane, benzene, toluene, nitrobenzene, chlorinated benzenes, butanol, butyl acetate, acetone, and other ketones may be used to effect the separation of mixtures of hydrocarbons, substituted hydrocarbons, waxes, asphaltenes, and polynuclear aromatics. Solvents such as phenol, benzophenone, etc., which are solid at room temperature may also be used to effect the separation of hydrocarbons. Water and/or water-alcohol mixtures may be used as solvent when fractionating inorganic salts.

While the zone precipitation of the instant invention is a relatively simple process, certain variables must be considered. These include the dimensions of the column, the thermal properties of the material, the length and temperature of the hot zone, the speed at which the hot zone traverses the column, the ambient temperature, the number of passes of the hot zone, and the heat transfer properties of the container in which the column of material is contained.

Many factors enter into the choice of variables for a particular separation. These factors are interdependent and not easily evaluated. However, the following general rules may be used for selecting operating conditions which will improve the separation:

(1) Rate of crystallization and, hence, rate of heater travel should not be too rapid to cause excessive nucleation with resultant entrapment of mother liquid between crystals.

(2) When successive heaters are used, the distance between zones should be great enough to provide a solid barrier between each zone. Generally, this distance will be zone length with systems of low thermal conductivity.

(3) The dimensions of the column will depend to a large extent on the thermal properties of the material being separated. High radial temperature gradients at the precipitating interface should be avoided in order to maintain radial product uniformity and, hence, obtain better separation. With materials of low thermal conductivity, this will, therefore, mean proper column design to insure rapid heat transfer.

Optimum travel rate, choice of zone length, ingot length, and interzone spacings are better described in Pfann, p. 57.

(4) Separation improves with additional solvent up to a point. The efficiency of separation decreases with increase of the number of passes. The leveling region has to be determined experimentally on each system.

The optimum conditions for a particular zone precipitation fractionation can be readily determined by one skilled in the art. For example, in wax separation the rate of heater travel should be no greater than 10 in./hr., preferably from 1 to 2 in./hr. The solvent to wax ratio should be from 6:1 to 3:1; while the number of passes, if one zone is used, may be from 8 to 40, preferably from 16 to 24. To reduce the time required for the process it is desirable to use more than one zone per pass. The zones should be situated so that the wax between the zones is permitted to solidify. If two zones are used, the number of passes required is halved.

In the case of separating polyolefins of varied molecular weights from about 100 to 10 parts of solvent per part of polymer are most desirable. The rate of heater travel should be between 1 to 4 in./hr. and at least 5 passes should be employed.

To further illustrate the instant invention, the following examples are given.

EXAMPLE 1

A microcrystalline wax having a melting point of 176° F., congeal point of 168° F., percent oil content, S.B.A. @ 0° F. of 1.8, Abraham hardness @ 105° F. of 15, and viscosity @ 210° F., SUS of 100, was zone precipitated in secondary butyl acetate with a solvent to wax ratio of 1:1. This wax had been previously deoiled and clay treated prior to zone precipitation. In these experiments the number of passes was 12, and the rate of heater travel was 0.5 in./hr. operating from top to bottom on a vertical glass tube containing the wax-solvent system. The run was made in a laboratory bench scale unit (Fisher Scientific Company) equipped with two molten zones 4" apart and a feed container 20" long and 0.5" in diameter. At the end of a run, the solid wax column was cut into sections, the solvent was evaporated, and the wax in each section was analyzed for melting point and aromatics. The results are indicated on FIGURE 3.

Zone precipitation fractionated the microwax into portions of varying melting points. The melting point spread between the end products was 22° F.

EXAMPLE 2

In order to show the improved separation obtained with zone precipitation as contrasted to zone melting, the microwax described in Example 1 was treated according to both processes. Three runs were made. In one, the microwax was treated in the absence of a solvent as in zone melting. In the other two runs, secondary butyl acetate in a 1:1 and 6:1 solvent to wax ratio was used; and at the end of the runs, the solid columns were cut into fractions and, in the case of the zone precipitated samples, the solvent evaporated off. The remaining wax was then analyzed for melting point. FIGURE 4 shows the melting point spread obtained in accordance with the process. It will be noted that the separation of the microwax after zone melting was nil. This was attributed to the fact that no selective precipitation occurred in the absence of a solvent. On the other hand, zone precipitation was highly effective as was also shown in Example 1. This is because the separation of the mixture according to melting point in the inert solvent during cooling behind the liquid zone is based on the fact that the first solids precipitated are those which are least soluble.

When the sec-butyl acetate to wax ratio was increased from 1:1 to 6:1, the melting point spread between the end products increased from 22 to 44° F. This shows that higher solvent to wax ratios result in improved separations.

EXAMPLE 3

In this example, the effect of solvent type on fractionation of microwax by zone precipitation is shown. Generally speaking, microwaxes are less soluble in polar than in nonpolar solvents. Since microwax fractionation by zone precipitation depends on wax solubility in the solvent, it is reasonable to expect a solvent effect on zone precipitation. Experiments were therefore made to evaluate solvents other than sec-butyl acetate which was used in the preceding example. These solvents included carbon tetrachloride, chloroform, toluene, ethylene dichloride, and methyl ethyl ketone, all tested at solvent/wax ratio of 3:1 and using four zone precipitation passes.

The data given in Table A show that the melting point difference between terminal cuts of the treated batch ranged from 6° F. for chloroform to 15.5° F. for methyl ethyl ketone, indicating that solvent type has an important bearing on wax fractionation by zone precipitation. The improved separation obtained with methyl ethyl ketone relative to the other systems studied is attributed to reduced solubility of wax in the solvent as shown by cloud point determination data included in the table.

*Table A*

| Solvent | Δ, °F. | Cloud point, °F, 5 gms. wax/100 cc. of solvent |
|---|---|---|
| Methyl ethyl ketone | 15.5 | 158 |
| Sec.-butyl acetate | 10.5 | 146 |
| Toluene | 10.0 | 107 |
| CCl₄, carbon tetrachloride | 9.5 | |
| $C_2H_4Cl_2$, ethylene dichloride | 9.0 | 138 |
| CHCl₃, chloroform | 6.0 | 104 |

It can be concluded from the example that solvents having limited wax solubility should improve fractionation by zone precipitation since these solvents effectively differentiate between the different wax components.

EXAMPLE 4

As noted above in the examples, the microwax used was deoiled and finished. The results obtained were compared with a partially deoiled, but unfinished microcrystalline wax. The unfinished wax generally has a higher oil content and hence a lower petroleum melting point. The melting point of the unfinished wax was 170° F. vs. 175° F. for the finished wax. The finished wax also has a better color because it undergoes percolation over an adsorbent such as clay.

Figure 5:
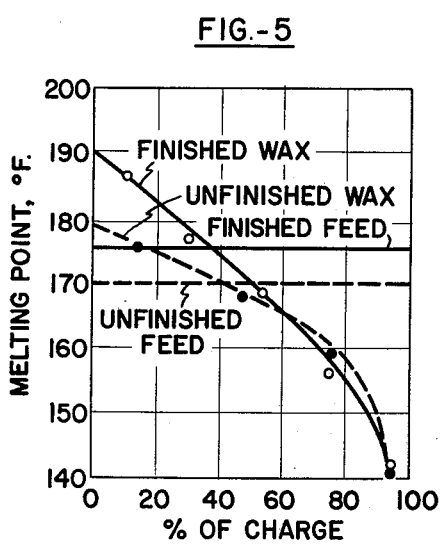

Both waxes were fractionated by zone precipitation using sec-butyl acetate at a solvent to wax ratio of 3:1. Table B gives other processing conditions as well as the melting points of the terminal cuts. FIGURE 5 shows the melting point profile along the ingot length.

*Table B*

| | Finished micro+sec.-butyl acetate | Unfinished micro+sec.-butyl acetate |
|---|---|---|
| Rate of heater travel, in./hr | 1.5 | 1.5 |
| Number of hot zones | 2 | 2 |
| Number of passes | 10 | 10 |
| Petroleum melting point, °F.: | | |
| Feed (wax only) | 175 | 170.5 |
| Top fraction (wax only) | 186.5 | 180 |
| Bottom fraction (wax only) | 141.5 | 142 |
| ΔT, °F | 45 | 38 |

EXAMPLE 5

With the unfinished microwax (melting point 170.5° F.), the product of highest melting point (176° F.) was of lighter color than the feed. The product of lowest melting point (142° F.) had a darker color than either the feed or the 176° F. melting point fraction. Only a visual inspection of color was possible, since ASTM color measuring methods require much greater samples than were obtained.

With more passes than have been used so far, it is possible to accumulate the color compounds from the wax into a very small fraction.

EXAMPLE 6

In this example, it is shown that zone precipitation leads to material fractionation into several cuts having widely different and useful application properties. For example, a 176.0° F. melting point microwax, described in Example 1, was zone precipitated with sec-butyl acetate at a solvent/wax ratio equal to 3:1 and using 10 zone passes. Five cuts of widely varying melting points ranging from 147 to 180° F. were obtained. The low melting cuts had excellent soft-coating properties as mesaured by penetration and flexibility. They also had unusual laminating and sealing strength.

*Table C*

| No. | Fraction | | Strength, gm./in. | | Needle penetration, mm. at 100° F. | Comparative flexibility at 40° F., 90° bend |
|---|---|---|---|---|---|---|
| | Weight percent | M.P., °F. | Laminating | Sealing | | |
| 1 (top) | 25 | 180 | 20 | 27 | 55 | 1 |
| 2 | 21 | 180 | 33 | 48 | 92 | 1 |
| 3 | 19 | 171 | 30 | 45 | 72 | 7 |
| 4 | 20 | 169 | 160 | 140 | 111 | |
| 5 | 15 | 147 | 300 | | >150 | 10 |
| Feed wax | | 175 | 82 | 64 | 60 | 1-3 |

The data also show that the high melting point fractions obtained were much harder than the original feed wax. These data therefore show that the material treated by zone precipitation was fractionated into cuts having widely different application properties.

EXAMPLE 7

It was found that aromatics, either mono- or polycyclic, tend to concentrate in the lower melting fractions of the wax. This separation employed two hot zones. This is shown in Table D:

*Table D*

| | Finished residual microwax + sec.-butyl acetate | | | Unfinished residual microwax + sec.-butyl acetate | | |
|---|---|---|---|---|---|---|
| Number of passes | 10 | | | 10 | | |
| Solvent:Wax | 6:1 | | | 3:1 | | |
| | Pet. M.P., °F. | Aromatics | | Pet. M.P., °F. | Aromatics | |
| | | U.V. $k_{260}$[a] | U.V. $k_{330}$[b] | | U.V. $k_{260}$ | U.V. $k_{330}$ |
| Feed (wax only) | 175 | 1.56 | 0.21 | 170.5 | 1.23 | 0.19 |
| Top frac. (wax only) | 186 | 1.30 | 0.16 | 176 | 1.17 | 0.18 |
| Bot. frac. (wax only) | 142 | 2.18 | 0.27 | 142 | 1.57 | 0.23 |
| Conc. factor bottom/top | | 1.7 | 1.7 | | 1.28 | 1.21 |

[a] $k_{260}$ is the U.V. extinction coefficient for aromatics in the one- and two-ring range. Concentration is proportional to k values.
[b] $k_{330}$ is the U.V. extinction coefficient for aromatics in the four-ring range. Concentration is proportional to k values.

This separation is very desirable since the reduction of trace amounts of these polycyclic aromatics from microwax minimizes possible toxicological effects. Other methods of reducing the aromatics content of the microwax such as by hydrogenation to naphthenes have proved very expensive. The high cost is attributed to the severe desulfurization which should precede hydrogenation. The desulfurization step is necessary because traces of sulfur in the wax poison the nickel hydrogenation catalyst very quickly.

EXAMPLE 8

Figure 6:
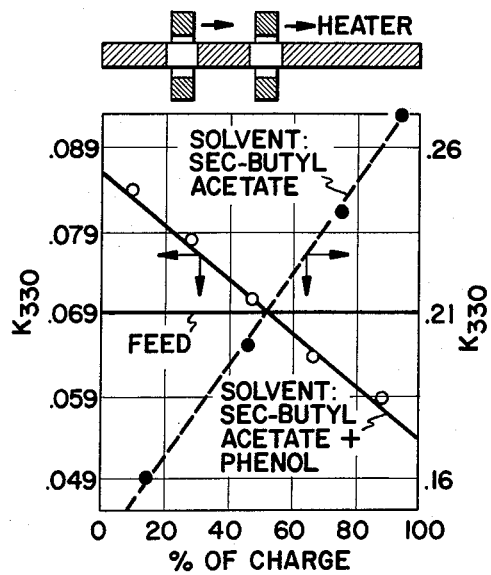

The data in Example 7 showed that aromatics concentrated in the direction of the moving zone with sec-butyl acetate as a solvent. When phenol was added to the sec-butyl acetate in a ratio of 1:1, the aromatics concentrated behind the moving zone. This is shown graphically in FIGURE 6.

This example is a clear illustration of the supremacy of zone precipitation over zone melting. The latter technique can never accomplish such a separation, mainly because it depends on the differences in properties of the components forming a mixture. On the other hand, zone precipitation by using a third component, depends for separation on the relative properties of each of the components in the mixture to the solvent.

EXAMPLE 9

A 5 wt. percent solution of dry, 90% crystalline polypropylene resin in decalin was prepared at 100° C. Approximately 0.2 wt. percent (on polymer) Ionol PX-441 stabilizer was added to minimize polymer degradation due to heat. The decalin employed was previously percolated through fresh silica gel in order to remove free peroxides and prevent polymer attack through oxidation. The hot polymer solution was then poured into the glass tube of a laboratory zone refiner. Upon cooling, the solution in the tube formed a gel. This gel was then subjected to zone precipitation operations by passing a hot molten zone at a rate of about 1.5 to 2 in./hr. through the gel column from bottom to top. After six passes, the gel was removed from the glass tube and cut to give five portions (numbered 1 to 5 from the bottom) of approximately equal weight. The polymer from each portion was recovered by adding the gel to an excess of methanol to precipitate the resin. After filtering, washing and drying, $\overline{M}_n$ of each polymer fraction as well as the original feed was assessed by viscosity measurements.

The viscosity data revealed that $\overline{M}_n = 3.8 \times 10^5$ approximately for the parent material. Also, $\overline{M}_n$ for the different polymer fractions ranged from $3.7 \times 10^5$ to $2.5 \times 10^5$ for cuts 2 to 5, respectively. The data for cut 1 show too low a $\overline{M}_n$ value relative to the other cuts or the feed. This low value of $\overline{M}_n$ for cut 1 is attributed to improper functioning of the laboratory zone refiner during this experiment which resulted in excessive heat treatment of the cut 1 polymer and, hence, possible degradation. However, the results of the other polymer fractions clearly indicate that the original feed was fractionated according to molecular weight.

Table E

| Sample: | $\overline{M}_n \times 10^{-5}$ |
|---|---|
| Feed | 3.8 |
| Cut #1 | [1] 3.5 |
| Cut #2 | 3.7 |
| Cut #3 | 3.5 |
| Cut #4 | 3.2 |
| Cut #5 | 2.5 |

[1] Polymer degraded by heat.

From this experimental evidence, it can be concluded that zone precipitation can be successfully applied to the molecular weight fractionation of linear polymers from solutions. Furthermore, fractionation can be accomplished without excessive manipulations. In practice, polymers obtained by solution polymerization could conceivably be fractionated using the solution obtained directly from the reactor.

This application of the invention is of particular importance since the molecular weight distribution of linear and some nonlinear polymers dictates important polymer properties such as solubility, melt viscosity, and tensile strength. Previous separation techniques such as fractional precipitation (see Principles of Polymer Chemistry, P. J. Flory, Cornell University Press (1953)), are laborious and time consuming and can normally only be carried out with highly dilute polymer solutions (approximately 2 wt. percent polymer).

Though the examples and illustrations above show the zone precipitation of a cylindrical shaped mass of material, the instant invention is not intended to be so limited. The term "elongated mass" used herein is meant to include, in addition to longitudinal shapes, other configurations such as circular, spiral and helical shapes. A variety of shapes which may be employed are illustrated in W. G. Pfann, supra, pp. 62 to 66.

The previous examples should be taken as merely illustrative of the invention and not definitive of its scope.

What is claimed is:

1. An improved process for separating a noncrystalline wax into higher and lower melting components which comprises: dissolving said wax in a solvent selected from the group consisting of methyl ethyl ketone, toluene, secondary butyl acetate, carbon tetrachloride, and ethylene glycol in a solvent/wax ratio of from about 6:1 to 3:1; cooling the resulting solution forming an elongated solid mass containing said solvent and said wax dissolved throughout said solvent; passing at least two spaced hot zones from one end of said elongated solid mass towards the other end; liquefying that portion of said elongated solid mass in the immediate vicinity of said hot zone; resolidifying at least a portion of said wax between said hot zones; repeating said passes until the wax has been melted and resolidified about 8 to 40 times, thereby selectively dissolving and increasing the concentration of higher melting point wax in one end of said elongated mass and increasing the concentration of the lower melting point wax in the other end; removing the solvent from said solution; and segmenting the wax into higher and lower melting point fractions.

2. The improved process of claim 1 wherein the said hot zones pass from one end of the said elongated mass to the other at a rate of from 1 to 2 in./hr. and the wax is melted and resolidified from 16 to 24 times.

3. An improved process for separating high molecular weight polymers of different molecular weight into components having a narrow range of molecular weights which comprises dissolving said polymers in a solvent which dissolves said components, but which is capable of selectively dissolving certain molecular weight components preferentially to the other molecular weight components, cooling and solidifying the resulting solution to form an elongated solid mass containing said solvent and said polymers distributed throughout said solvent, passing a hot zone from one end of said elongated solid mass towards the other end, liquefying that portion of said elongated solid mass in the immediate vicinity of said hot zone, resolidifying that portion of said elongated solid mass formerly in the immedite vicinity of said hot zone and concentrating that portion of narrow range of molecular weight polymers which are selectively dissolved by said solvent in the direction of motion of said hot zone.

4. The improved process of claim 3 wherein the polyolefins are polypropylene and the solvent is decalin.

5. The improved process of claim 4 wherein the solvent to polymer ratio is between 100:1 and 10:1.

6. The process of claim 1 wherein the said wax is a microcrystalline wax.

7. An improved process for fractionating components of a mixture containing at least two components which comprises dissolving said mixture in a solvent which dissolves said components, but which is capable of selectively dissolving some of said components to a greater degree than the other components, cooling the resulting solution to form an elongated solid mass containing said solvent and said mixture to be fractionated distributed throughout said solvent, passing a hot zone from one end of said elongated solid mass towards the other end, temporarily liquefying that portion of said elongated solid mass in the immediate vicinity of said hot zone, resolidifying that portion of said elongated solid mass formerly in the immediate vicinity of said hot zone, selectively rejecting the more soluble components from said resolidified mass and concentrating the more soluble components in the direction of motion of said hot zone, thereby depleting said more soluble components from the remaining portion of said solvent and solid mass.

8. An improved process for concentrating a first component from a mixture containing at least the other component which comprises dissolving said mixture in a solvent which dissolves said components, but which is capable of selectively dissolving said first component to a greater degree than the other component, cooling the resulting solution to form an elongated solid mass containing said solvent and said mixture distributed throughout said solvent, passing a hot zone from one end of said elongated solid mass towards the other end, temporarily liquefying that portion of said elongated solid mass in the immediate vicinity of said hot zone, resolidifying that portion of said elongated solid mass formerly in the immediate vicinity of said hot zone, selectively rejecting the more soluble component from said resolidified mass and concentrating the more soluble first component in the direction of motion of said hot zone, thereby depleting said more soluble first component from the remaining portion of said solvent and solid mass.

9. An improved process for fractionating non-crystalline components of a mixture containing at least two components which comprises dissolving said mixture in a solvent which dissolves said components, but which is capable of selectively dissolving some of said components to a greater degree than the other components, cooling the resulting solution to form an elongated solid mass containing said solvent and said mixture to be fractionated distributed throughout said solvent, passing a hot zone from one end of said elongated solid mass towards the other end, temporarily liquefying that portion of said elongated solid mass in the immediate vicinity of said hot zone, resolidifying that portion of said elongated solid mass formerly in the immediate vicinity of said hot zone, selectively rejecting the more soluble components from said resolidified mass and concentrating the more soluble components in the direction of motion of said hot zone, thereby depleting said more soluble components from the remaining portion of said solvent and resolidified mass.

10. The improved process of claim 3 wherein the said high molecular weight polymers are polyolefins.

11. An improved process for fractionating noncrystalline wax into higher and lower melting point fractions which comprises dissolving said wax in a solvent which dissolves said wax but which is capable of selectively dissolving some of said wax components to a greater degree than other components, cooling the resulting solution to form an elongated solid mass containing said solvent and said wax to be fractionated distributed throughout said solvent, passing a hot zone from one end of said elongated mass towards the other end, temporarily liquefying that portion of said elongated solid mass in the immediate vicinity of said hot zone, resolidifying that portion of said elongated solid mass formerly in the immediate vicinity of said hot zone thereby selectively rejecting the more soluble components from said resolidified mass, and concentrating the higher melting point wax in one end of said elongated mass and increasing the concentration of the lower melting point wax in the other end, thereby fractionating the wax into higher and lower melting point fractions, and subsequently removing the solvent.

References Cited in the file of this patent

UNITED STATES PATENTS 2,739,088     Pfann _____ Mar. 20, 1956

OTHER REFERENCES

Warth: The Chemistry and Technology of Waxes, 2nd ed., 1956, pp. 450–457.

Pfann: Zone Melting, 1958, pp. 53–54, 109–111.